United States Patent [19]
Mototani et al.

[11] Patent Number: 5,983,942
[45] Date of Patent: *Nov. 16, 1999

[54] DAMPER OF HYDRAULIC PILOT VALVE

[75] Inventors: Masayoshi Mototani; Seita Hayashi; Jun Maruyama, all of Kawasaki, Japan

[73] Assignee: Komatsu Ltd., Tokyo, Japan

[ * ] Notice: This patent is subject to a terminal disclaimer.

[21] Appl. No.: 09/149,391

[22] Filed: Sep. 8, 1998

Related U.S. Application Data

[62] Division of application No. 08/962,917, Oct. 27, 1997, Pat. No. 5,845,680, which is a continuation of application No. 08/615,303, filed as application No. PCT/JP94/01606, Sep. 28, 1994, abandoned.

[30] Foreign Application Priority Data

Sep. 28, 1993 [JP] Japan .................................. 5-241058

[51] Int. Cl.⁶ .............................. F15B 13/02; F16K 31/48
[52] U.S. Cl. .................................... 137/636.1; 137/596.1; 251/54
[58] Field of Search .............................. 137/636.1, 596.1; 251/54

[56] References Cited

U.S. PATENT DOCUMENTS 5,251,660  10/1993  Hori et al. ........................... 137/636.1
5,558,127   9/1996  Maruyama et al. .................. 137/636.1
5,845,680  12/1998  Mototani et al. .................... 137/636.1

FOREIGN PATENT DOCUMENTS 0 364 603   4/1990  European Pat. Off. .
57-61247    4/1982  Japan .
58-176169  11/1983  Japan ....................................... 251/48
3-105787   11/1991  Japan .................................. 137/636.1
3-249414   11/1991  Japan .
4-36104     3/1992  Japan .
4-53853     5/1992  Japan .

*Primary Examiner*—Gerald A. Michalsky
*Attorney, Agent, or Firm*—Frishauf, Holtz, Goodman, Langer & Chick, P.C.

[57] ABSTRACT

A damper for a hydraulic pilot valve having a valve body in which a plurality of pressure reducing valves, a rotational shaft, an operation member attached to the rotational shaft and a handling member rotating the rotational shaft are provided. The pressure reducing valves are operated through the operation member by rotating the rotational shaft by the handling member, and the damper is disposed in the valve body and is adapted to apply an operational resistance to the operation member due to a viscous resistance of a fluid having high viscosity.

10 Claims, 6 Drawing Sheets

DAMPER OF HYDRAULIC PILOT VALVE

CROSS REFERENCE TO RELATED APPLICATIONS

This application is a division of U.S. application Ser. No. 08/962,917, filed Oct. 27, 1997, now U.S. Pat. No. 5,845,680, which is a continuation of U.S. application Ser. No. 08/615,303, filed Mar. 12, 1996, now abandoned, which was the National Stage of International Application No. PCT/JP94/01606, filed Sep. 28, 1994.

TECHNICAL FIELD

The present invention relates to a damper for a hydraulic pilot valve utilized for a construction machine or an industrial equipment.

1. Background Art

There is known a hydraulic pilot valve of a type in which a spool is slidably inserted into a valve body, an operation member slidably supported by the valve body is disposed so as to face the spool, a handling member is mounted to the operation member, and a pressurized pilot oil is supplied by the handling member to thereby push the spool through the swinging motion of the operation member.

Conventionally, a hydraulic pilot valve for a travelling circuit for a power shovel or the like is mounted to an under surface of a floor plate of a driver's cab and an operator sitting on a seat disposed on the floor plate operates the hydraulic pilot valve. Accordingly, in order for the operator to easily handle the hydraulic pilot valve, it is necessary to locate a considerably long handling member.

For such location, there is a danger that the handling member is itself moved by an inertia force caused by a vibration of a vehicle body and, according to such movement, the operation member is swung and the spool is hence pushed by the operation member to thereby erroneously supply the pressurized pilot oil, resulting in an erroneous and potentionally dangerous driving of a fluid motor for travelling.

In order to avoid such problem, there is proposed a hydraulic pilot valve provided with a damper.

For example, as disclosed in Japanese Utility Model Laid-open Publication No. HEI 4-53853, there is known a structure in which a mechanical type damper is disposed between a handling member and a vehicle body, or as disclosed in Japanese Utility Model Laid-open Publication No. HEI 4-36104, there is known a structure in which a hydraulic damper limiting displacement of a spool by utilizing a hydraulic operating oil is assembled in a valve body.

However, in the former prior art, since the mechanical damper is disposed externally of the valve body, a large setting area is required and this involves troublesome setting working.

In the latter prior art, the above defect may be eliminated. However, because the structure utilizes hydraulic operating oil, the viscosity of the hydraulic operating oil largely varies in accordance with a temperature thereof and it is difficult to obtain a stable damper effect. Thus, in a case where the temperature of the hydraulic operating oil is low and the viscosity thereof is high, the vibration attenuating effect to the handling member is large, whereas in a case where the temperature of the hydraulic operating oil is high and the viscosity thereof is low, the vibration attenuating effect to the handling member is small.

Accordingly, an object of the present invention is to provide a damper for a hydraulic pilot valve which does not have an increased area for setting the hydraulic pilot valve and which is capable of achieving a stable damper function.

2. Disclosure of the Invention

To achieve the above object, according to the present invention, there is provided a damper of a hydraulic pilot valve in which a plurality of pressure reducing valves, a rotational shaft, an operation member attached to the rotational shaft and a handling member rotating the rotational shaft are provided for a valve body and the pressure reducing valves are operated through the operation member by rotating the rotational shaft by the handling member, the damper being characterized in that the damper is disposed in the valve body and is adapted to apply an operational resistance to the operation member due to a viscous resistance of a fluid having high viscosity.

According to this structure, since the damper adapted to apply an operational resistance to the operation member is arranged in the valve body, the whole structure of the hydraulic pilot valve is itself made compact and an area for setting the same can be reduced. Since the damper operates by the utilization of the viscous resistance of the fluid having high viscosity extremely less changeable of viscosity due to temperature, a constant and extremely stable damper function can be achieved even if the temperature varies.

Furthermore, as the specific structure of the damper, it may be preferred that a piston is fitted to be rotatable in a case fitted to the valve body so as to form an annular space between the case and the piston, the high viscosity fluid is sealed up in the annular space to make large a rotational resistance of the piston and the piston and the rotational shaft are coupled together so as to be rotated together.

Moreover, in this structure, the lever may be mounted to the piston and the arm may be attached to the rotational shaft. The piston and the rotational shaft may be coupled by engaging the pin provided for the arm with the cutout groove formed to the lever.

Still furthermore, it may be preferred that a piston is fitted in a case fitted rotatably in the valve body to form an annular space between the case and the piston, the high viscosity fluid is sealed up in the annular space to increase a rotational resistance of the case, and the case and the operation member are coupled with each other so as to rotate both the case and the operation member together.

In this structure, a projection may be formed to the case, a recessed groove may be formed to the operation member, and the case and the operation member are coupled through the engagement between the recessed groove and the projection.

Still furthermore, it may be preferred that the damper has another structure in which a pair of pistons coupled together are secured in the valve body, cylinders are fitted to the pistons to be slidable to form cylinder chambers between the pistons, the high viscosity fluid is sealed up in the cylinder chambers to increase a sliding resistance of the cylinders, and the cylinders and the rotational shaft are coupled with each other so as to slide the cylinders in relation to a rotation of the rotational shaft.

In this structure, it may be preferred that an arm is attached to the rotational shaft, flange portions are formed to the cylinders, and the rotational shaft and the cylinders are coupled through the arm abutting against the flange portions.

BRIEF DESCRIPTION OF THE DRAWINGS

The present invention will be more comprehensive from the following detailed description and accompanying drawings representing embodiments of the present invention. Further, the embodiments represented by the accompanying drawings are not intended to limit the scope of the invention and are provided for easy understanding of the disclosure.

In the accompanying drawings.

DETAILED DESCRIPTION damper for a hydraulic pilot valve according to preferred embodiments of the present invention will be described hereunder with reference to the accompanying drawings.

Figure 1:
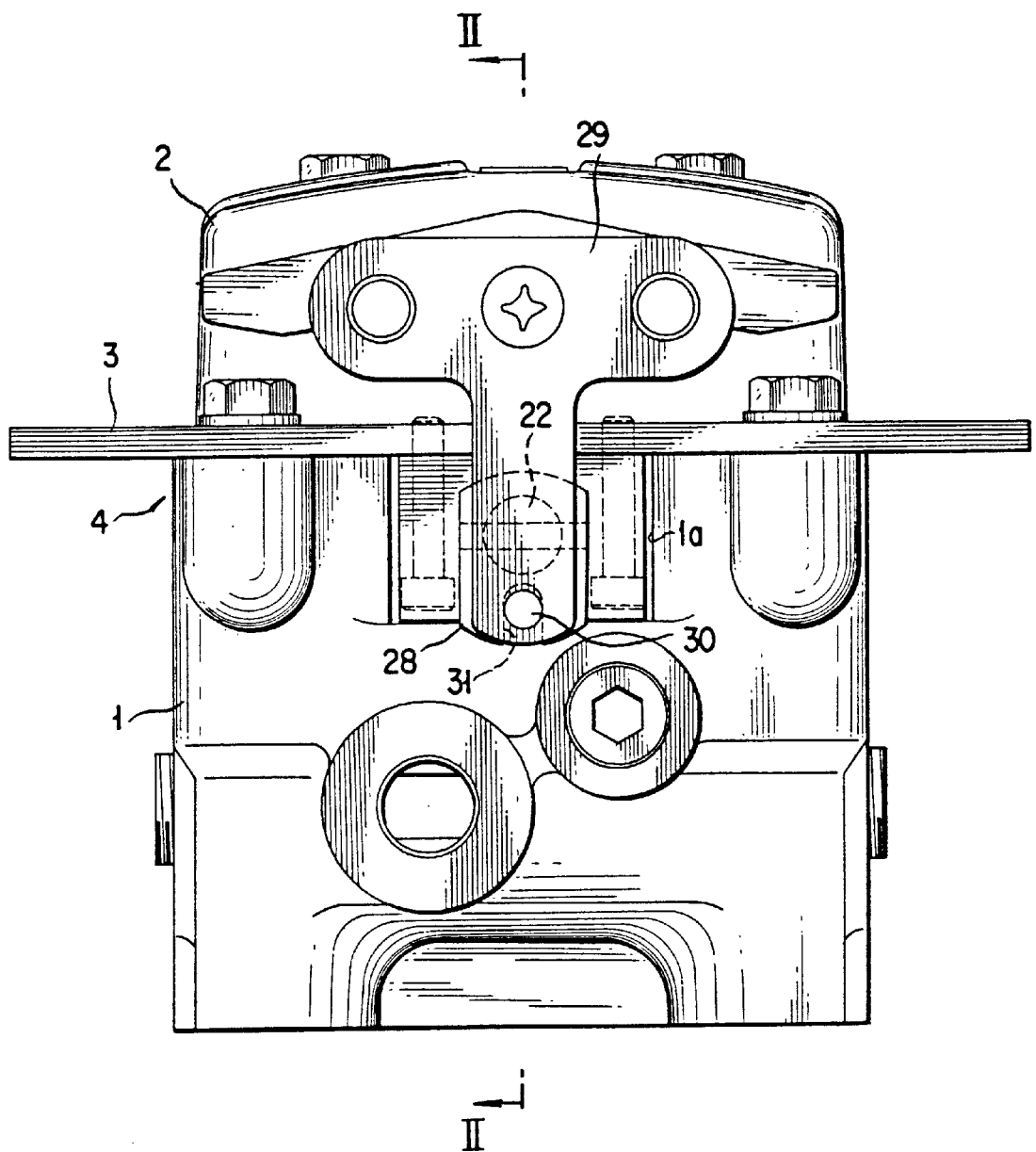
FIG. 1 is a front view of a hydraulic pilot valve including a first embodiment of a damper according to the present invention.
Figure 2:
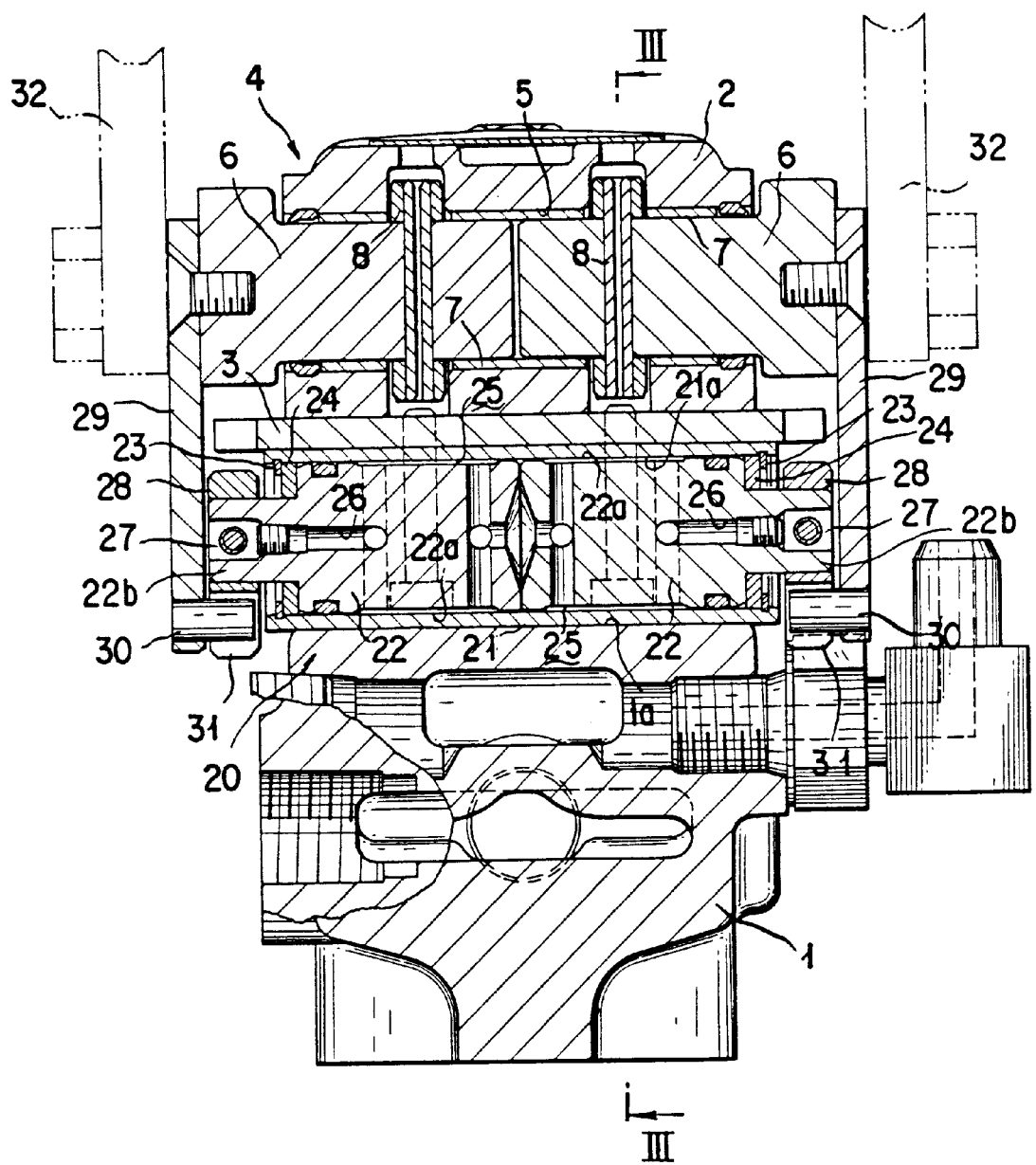
FIG. 2 is a sectional view taken along the line II—II of FIG. 1.
Figure 3:
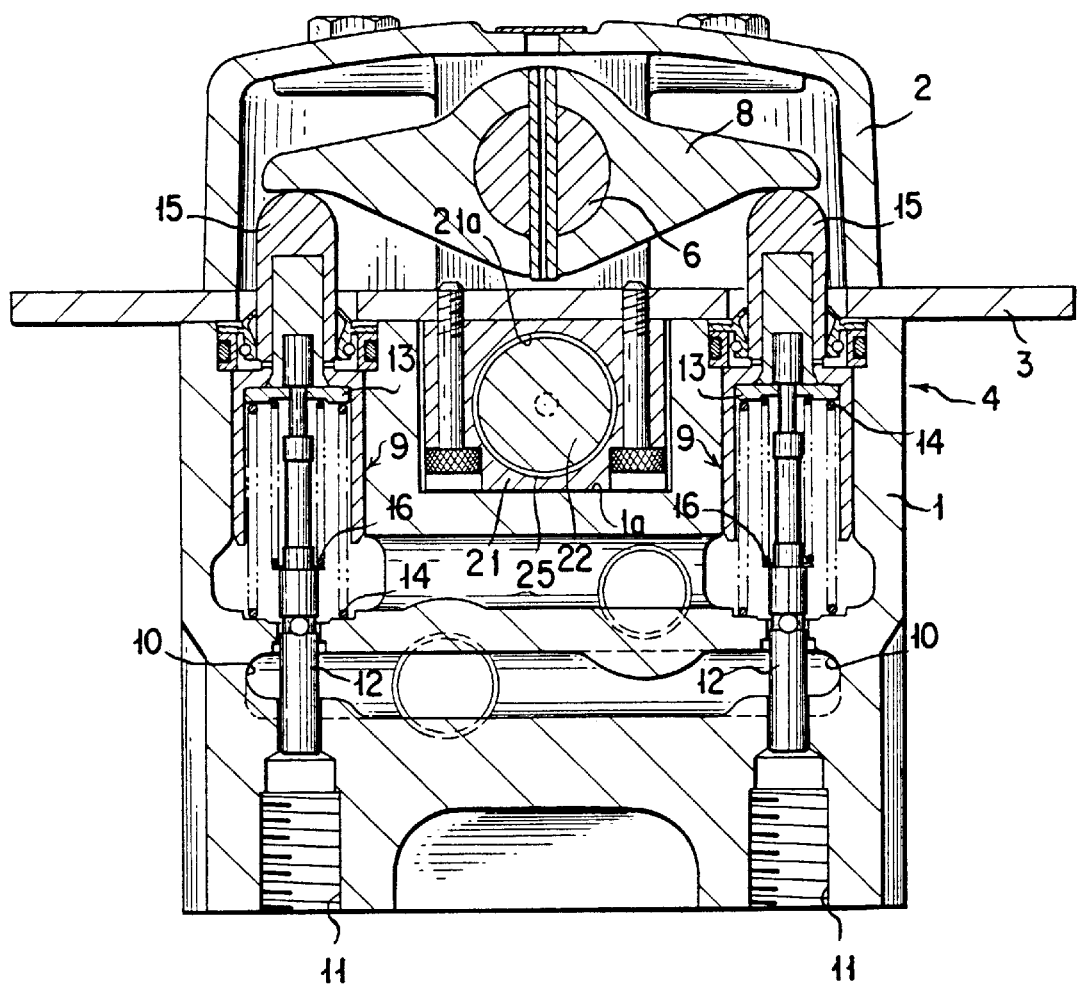
FIG. 3 is a sectional view taken along the line III—III of FIG. 1.

FIGS. 1 to 3 show a hydraulic pilot valve provided with a damper according to the first embodiment of the present invention.

As shown in FIGS. 1 and 2, a valve body 4 is composed of a lower body 1, a plate 3 attached to the lower body 1 and an upper body 2 mounted further on the plate 3. An axial bore 5 is formed to the upper body 2 so as to extend in a horizontal direction, and a pair of rotational shafts 6 are inserted into the bore 5 and supported thereby through a bush 7 to be rotatable. Operation members 8 are mounted to the rotational shafts 6, respectively, and as shown in FIG. 3, four pressure reducing valves 9 are disposed to the lower body 1 so as to face both ends of the respective operation members 8.

Each of the pressure reducing valves 9 comprises, as shown in FIG. 3, a spool 12 communicating or shutting out an inlet port 10 and an outlet port 11, a retainer 13 engaged with an upper end portion of the spool 12, a spring 16 for urging the retainer 13 against the upper end portion of the spool 12, a main spring 14 for urging upward the spool 12 through the retainer 13 to a shut-out position, and a piston 15 fitted in the spool 12 from an upper side thereof. When the piston 15 is pushed downward by the operation members 8, the spool 12 moves towards the communication position to thereby establish the communication between the inlet port 10 and the outlet port 11 to thereby deliver the hydraulic oil from the inlet port 10 to the outlet port 11.

The lower body 1 has, as shown in FIG. 2, a recessed portion 1a having an upward opening to which a rotational damper 20 is mounted.

With the structure of the damper 20, a case 21 having an axial bore 21a is fitted in the upward recessed portion 1a of the lower body 1, and a pair of pistons 22 are fitted in the axial bore 21a to be rotatable in a manner opposing to each other so that the pistons 22 are not removed from the axial bore 21a by means of snap rings 23 and press plates 24. Each of the pistons 22 is formed with a small diameter portion 22a to provide an annular space 25 having a distance of about 0.1 to 0.15 mm between the small diameter portion 22a and the axial bore 21a of the case 21, and a fluid having a high viscosity such as silicon oil is supplied into the annular space 25 through an oil hole 26 formed to the piston 22 and a sealing condition for the fluid is established by means of a sealing member. A plug 27 is applied to the oil bore 26 of the piston 22. The piston 22 has a small diameter portion 22b projecting over the case 21 to which a lever 28 having a cutout groove 31 is secured, and a pin 30 provided for an arm 29 fastened by a bolt to the end portion of each of the rotational shafts 6 is fitted to the cutout groove 31 of the lever 28, thereby rotating the pistons 22 in accordance with the rotation of the rotational shafts 6.

Further, the case 21 may be formed integrally with the lower body 1 or the plate 3, or formed as separate members which are to be fastened by means of bolts.

This embodiment will operates in the following manner.

When the rotational shafts 6 are rotated through the operation of the handling member 32 such as lever or pedal attached to the end portion of the rotational shafts 6, the operation member 8 is swung to thereby depress the piston 15 and then move the spool 12 to its communication position, whereby the pressurized oil is discharged from the inlet port 10 towards the outlet port 11.

At this operation, the piston 22 is also rotated together with the rotational shafts 6, and the piston 22 is subjected at this time to the viscous resistance by the fluid having high viscosity sealed up in the annular space 25, so that the rotational resistance becomes large, thus attaining the damper function.

Accordingly, the movement of the handling member 32 due to the inertia force caused by such as vibration of the vehicle body can be prevented by this rotational resistance of the piston 22.

Figure 4:
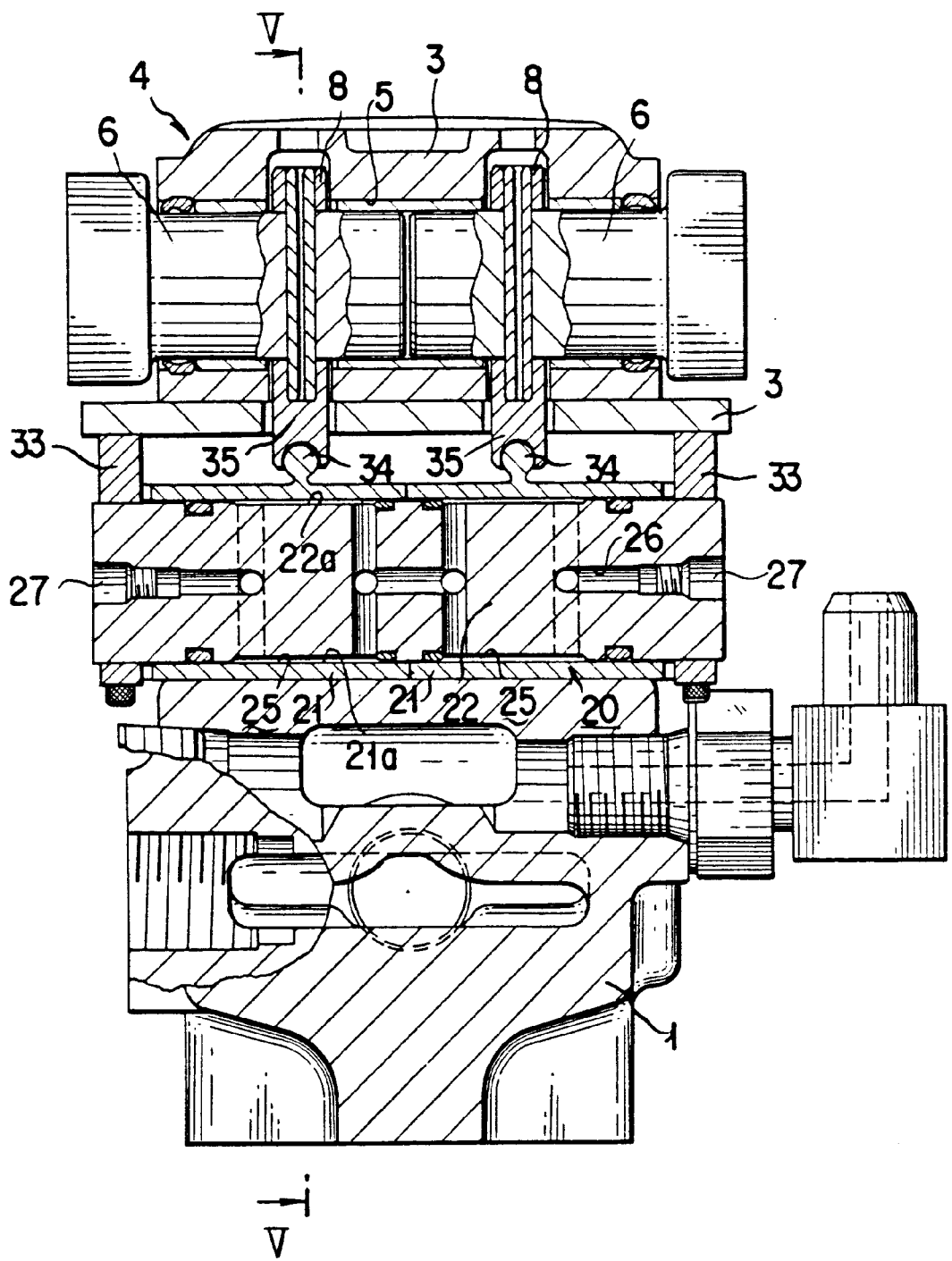
FIG. 4 is a sectional view of a hydraulic pilot valve including a second embodiment of a damper according to the present invention.
Figure 5:
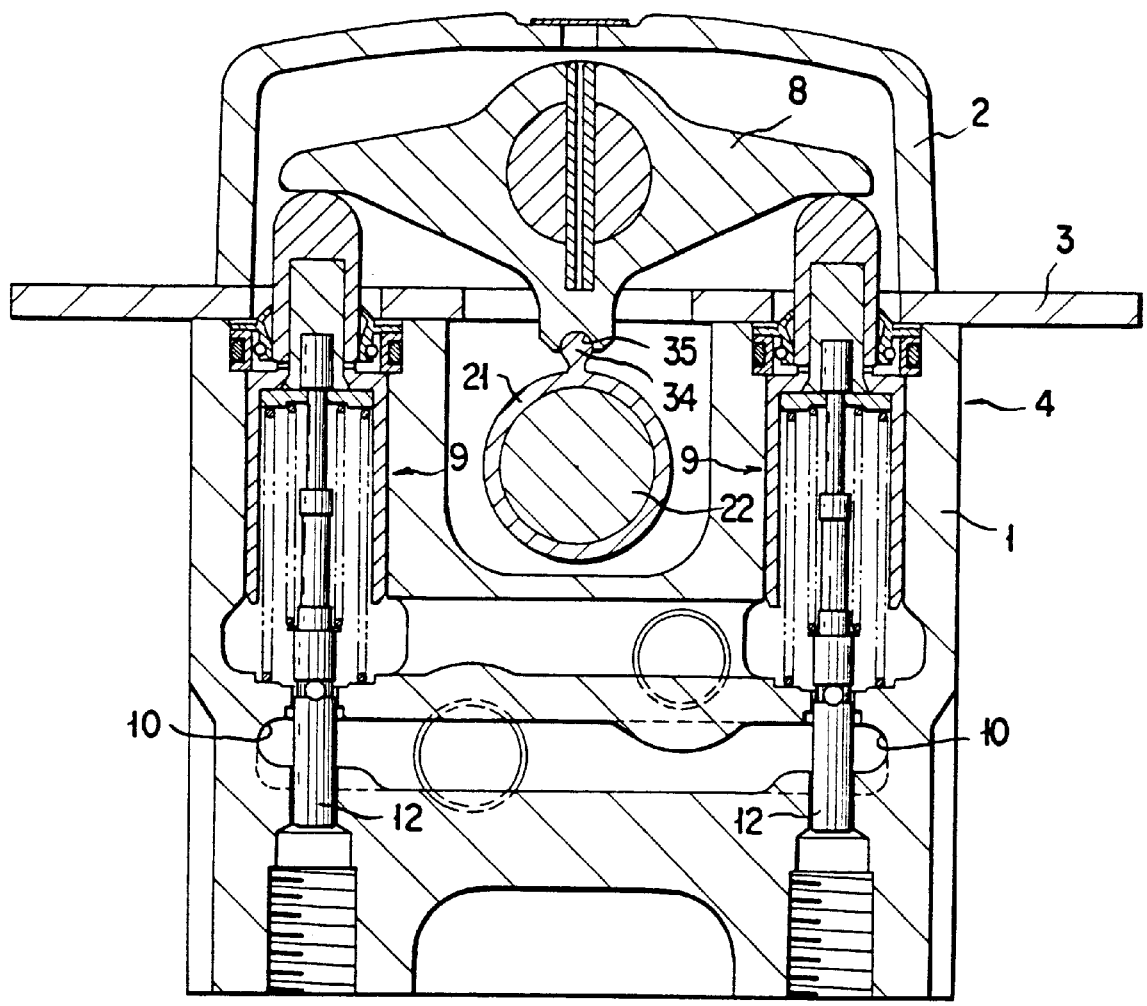
FIG. 5 is a sectional view taken along the line V—V of FIG. 4.

FIGS. 4 and 5 show a hydraulic pilot valve including the second embodiment of the present invention. This embodiment differs from the first embodiment in that the piston 22 of the damper 20 is formed of an elongated integral body, both end portions of the piston 22 are fixed to the plate 3 through brackets 33, a pair of cylindrical cases 21 are fitted to the piston 22 to be rotatable so that an annular space 25, in which a fluid having high viscosity fills, is formed between the cases 21 and the piston 22, and projections 34 formed integrally to the outer peripheral surfaces of the cases 21 are fitted to a recessed groove 35 formed to the operation member 8.

According to this structure, when the operation member 8 is swung, the cases 21 are also rotated and the rotational resistance is caused by the viscous resistance of the high viscosity fluid with respect to the cases 21, thus achieving the damper function.

Further, the rotational damper 20 of the first embodiment may be constructed such that the bush 7 and the rotational shafts 6 are instead composed of the case 21 and the piston 22, respectively, and the annular space in which the high viscosity fluid is sealed up is formed between the bush 7 and the rotational shafts 6. In such case, it is of course not necessary to locate any connection structure between the damper and the rotational shafts or operation member.

Figure 6:
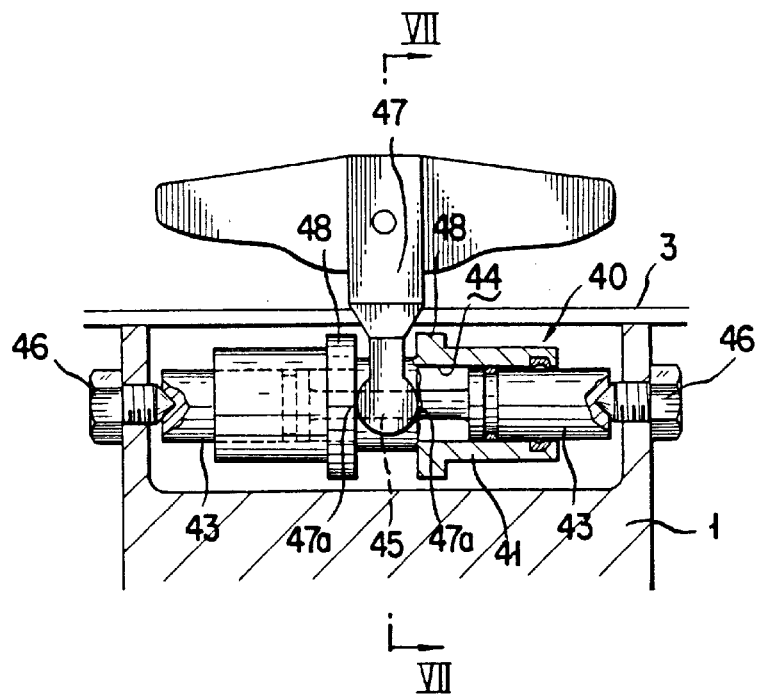
FIG. 6 is a sectional view of a hydraulic pilot valve including a third embodiment of a damper according to the present invention.
Figure 7:
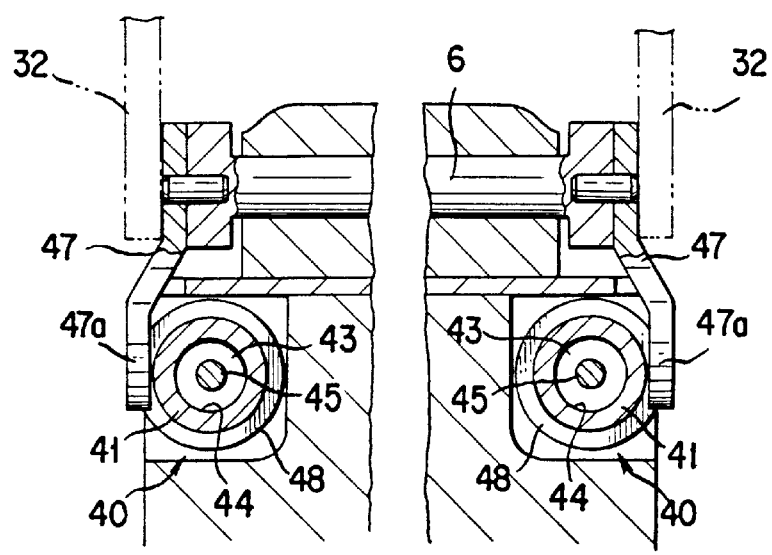
FIG. 7 is a sectional view taken along the line VII—VII of FIG. 6.

FIGS. 6 and 7 show a hydraulic pilot valve including the third embodiment of the present invention, in which a direct-drive-type damper 40 is mounted to the lower body 1.

The direct-drive-type damper 40 has a structure such that a pair of pistons 43 are coupled together through a connection rod 45 and fixed to the lower body 1 by a pair of bolts 46 so as to clamp the same, cylinders 41 are fitted to the paired pistons 43, respectively, to be slidable such that cylinder chambers 44 are formed between the respective pistons 43 and cylinders 41, and a fluid having high viscosity is sealed up in the cylinder chambers 44 to thereby increase the sliding resistance of the cylinders 41. A pair of flange portions 48 are formed to the central portions of the outer peripheral surfaces of the respective cylinders 41, and a circular portion formed to the front end of an arm 47 attached to the rotational shaft 6 is fitted between the paired flange portions 48 so that both end surfaces 47a of the circular front end portion abuts against the paired flange portions 48 of the cylinders 41.

According to this structure, when the rotational shafts 6 are rotated by operating the handling member 32, the arm 47 is swung and the cylinders 41 are thereby slid, whereby the sliding resistance is applied to the cylinders 41 due to the viscous resistance of the high viscosity fluid, thus achieving the damper function.

According to the respective embodiments described above, since the damper for applying the operational resistance to the operation member 8 is disposed in the valve body, the hydraulic pilot valve is itself made compact and a space for setting the valve can be reduced. Furthermore, the damper utilizes the viscous resistance of the high viscosity fluid, the damper function is made constant even if a temperature of the fluid varies, thus achieving a stable damper function.

Further, it is a self-evident matter by those skilled in the art that although the present invention was described with reference to the exemplary embodiments, other various changes, deletions and additions can be made with respect to the described embodiments without departing from the subject and scope of the present invention. Accordingly, it is to be understood that the present invention is not limited to the described embodiments and includes a scope prescribed by the elements recited in the claims and a scope equivalent thereto.

We claim:

1. A damper for a hydraulic pilot valve, said hydraulic pilot valve comprising a valve body having a plurality of pressure reducing valves, a rotational shaft, an operation member coupled to the rotational shaft, and a handling member for rotating the rotational shaft, said plurality of pressure reducing valves being responsive to the operation member, which is responsive to the rotational shaft being rotated by the handling member, the damper comprising a space having a high viscosity fluid contained therein, the space being symmetrically disposed in the valve body so as to apply a symmetrical operational resistance to the operation member due to a viscous resistance of the high viscosity fluid.

2. A damper of a hydraulic pilot valve according to claim 1, wherein said operation member is movable in a plurality of different operational directions, and said damper is adapted to apply the symmetrical operational resistance to said operation member in each of the plurality of different operational directions.

3. A damper of a hydraulic pilot valve according to claim 1, wherein said damper is rotatable together with the rotational shaft.

4. A damper of a hydraulic pilot valve according to claim 1, further comprising a piston fitted to be rotatable in a case fitted to the valve body so as to form an annular space between the case and the piston, wherein the high viscosity fluid is sealed in the annular space to increase a rotational resistance of the piston, and wherein the piston and the rotational shaft are coupled together so as to be rotatable together.

5. A damper for a hydraulic pilot valve according to claim 4, further comprising a lever secured to the piston, an arm mounted to the rotational shaft, and an engaging pin coupling the piston and the rotational shaft together, said engaging pin being formed in the arm to engage a cutout groove formed in the lever.

6. A damper for a hydraulic pilot valve according to claim 1, further comprising a piston fitted in a case fitted rotatably in the valve body so as to form an annular space between the case and the piston, wherein the high viscosity fluid is sealed in the annular space to increase a rotational resistance of the case, and wherein the case and the operation member are coupled together so as to be rotatable together.

7. A damper for a hydraulic pilot valve according to claim 6, further comprising a projection formed on the case, and a recessed groove formed in the operation member, wherein the case and the operation member are coupled through an engagement between the recessed groove and the projection.

8. A damper for a hydraulic pilot valve according to claim 1, further comprising a pair of pistons coupled together and fixed in the valve body, and cylinders fitted to the pistons to be slidable to form cylinder chambers between the pistons, wherein the high viscosity fluid is sealed in the cylinder chambers to increase a sliding resistance of the cylinders, wherein the cylinders and the rotational shaft are coupled with each other so as to slide the cylinders in relation to a rotation of the rotational shaft, and wherein the damper is symmetrical in structure with respect to both an insertion direction and pullout direction of the handling member.

9. A damper for a hydraulic pilot valve according to claim 8, further comprising an arm attached to the rotational shaft, and flange portions formed on the cylinders, wherein the arm abuts against the flange portion and couples together the rotational shaft and the cylinders.

10. A damper for a hydraulic pilot valve, said hydraulic pilot valve comprising a valve body having a plurality of pressure reducing valves, a rotational shaft, an operation member coupled to the rotational shaft for movement in different operational directions, and a handling member for rotating the rotational shaft, the plurality of pressure reducing valves being responsive to the operation member, the operation member being responsive to the rotational shaft being rotated by the handling member so as to move the operation member, wherein the damper is symmetrically disposed in the valve body, the damper having a high viscosity fluid in fluid communication therewith, the damper being arranged to apply a symmetrical operational resistance to the operation member in each different operational direction thereof due to a viscous resistance of the high viscosity fluid.

* * * * *